US012564819B1

(12) United States Patent
Pfaff

(10) Patent No.: US 12,564,819 B1
(45) Date of Patent: Mar. 3, 2026

(54) AUTOMATIC FOOD SPREAD MIXER

(71) Applicant: Jason Pfaff, Cave Creek, AZ (US)

(72) Inventor: Jason Pfaff, Cave Creek, AZ (US)

( * ) Notice: Subject to any disclaimer, the term of this patent is extended or adjusted under 35 U.S.C. 154(b) by 190 days.

(21) Appl. No.: 17/493,831

(22) Filed: Oct. 4, 2021

Related U.S. Application Data

(60) Provisional application No. 63/087,870, filed on Oct. 5, 2020.

(51) Int. Cl.
| | |
|---|---|
| *B01F 29/31* | (2022.01) |
| *B01F 29/34* | (2022.01) |
| *B01F 29/62* | (2022.01) |
| *B01F 35/221* | (2022.01) |
| *B01F 35/32* | (2022.01) |
| *A23L 25/00* | (2016.01) |
| *A23L 25/10* | (2016.01) |
| *B01F 101/06* | (2022.01) |

(52) U.S. Cl.
CPC .............. *B01F 29/31* (2022.01); *B01F 29/34* (2022.01); *B01F 29/62* (2022.01); *B01F 35/221422* (2022.01); *B01F 35/22161* (2022.01); *B01F 35/3204* (2022.01); *A23L 25/10* (2016.08); *A23L 25/30* (2016.08); *A23V 2002/00* (2013.01); *B01F 2101/06* (2022.01); *B01F 2215/0481* (2013.01)

(58) Field of Classification Search
CPC ........... B01F 29/31; B01F 29/34; B01F 29/62
USPC ........................................................ 366/218
See application file for complete search history.

(56) References Cited

U.S. PATENT DOCUMENTS

| | | | | |
|---|---|---|---|---|
| 305,014 | A * | 9/1884 | Mueller .................. | B01F 29/31 |
| | | | | 118/56 |
| 2,597,291 | A * | 5/1952 | Clegg ..................... | A01J 15/04 |
| | | | | 366/208 |
| 3,167,890 | A | 2/1965 | Smith | |
| 3,765,131 | A * | 10/1973 | Christensen ............ | B24B 31/02 |
| | | | | 451/328 |
| 3,879,019 | A * | 4/1975 | Fulkerson ............... | B01F 29/31 |
| | | | | 414/433 |
| 4,669,274 | A * | 6/1987 | Huang ................... | A23G 9/103 |
| | | | | 366/233 |
| 5,651,613 | A * | 7/1997 | Mays ...................... | B01F 29/31 |
| | | | | 366/144 |
| 6,450,681 | B1 * | 9/2002 | Nettelhoff .............. | C07K 14/76 |
| | | | | 366/348 |
| 2009/0279379 | A1 * | 11/2009 | Gurney ................... | B01F 29/60 |
| | | | | 366/198 |
| 2017/0173545 | A1 * | 6/2017 | Myer ...................... | B01F 29/31 |
| 2018/0036695 | A1 * | 2/2018 | Karatsinides ........... | B01F 29/31 |
| 2019/0184347 | A1 * | 6/2019 | Seaborn ................. | B01F 29/33 |
| 2020/0391166 | A1 * | 12/2020 | Ferguson, Jr. ........ | A47J 43/085 |
| 2021/0197147 | A1 * | 7/2021 | Tousek ................... | B01F 29/31 |

FOREIGN PATENT DOCUMENTS

| | | | | | |
|---|---|---|---|---|---|
| DE | 102011016043 | A1 * | 3/2012 | .......... | B01F 11/0002 |
| DE | 102012011338 | B3 * | 5/2013 | ........... | B01F 9/0016 |
| GB | 412621 | A * | 1/1933 | | |
| GB | 1429485 | A * | 3/1976 | ........... | B01F 9/0016 |

\* cited by examiner

*Primary Examiner* — Marc C Howell
(74) *Attorney, Agent, or Firm* — The Hill Law Firm, PLC; Scott A. Hill

(57) ABSTRACT

An automatic food spread mixer is used to rotate a jar of nut butter at approximately 16 rpm for about an hour.

14 Claims, 9 Drawing Sheets

02

10

AUTOMATIC FOOD SPREAD MIXER

BACKGROUND OF THE INVENTION

Mixing food spreads and pastes which are stored in a closed container, such as natural peanut butter and nut butter, is typically performed by inserting some sort of stirring member into the container and stirring together the liquids and solids. Natural peanut butter is a popular food spread, and it is very common for the peanut solids to sink to the bottom of a jar while the peanut oils, which are a liquid at room temperature, float to the top. Many peanut butter spreads resort to hydrogenating the oils so they are more solid at room temperature, adding emulsifiers to prevent the oils from separating, or adding palm oil as a stabilizer. Some consumers believe that these modifications to peanut butter result in a food that contains unhealthy fats.

Natural peanut butters separate rather quickly, so an end consumer will need to mix the peanut oils back into the peanut solids before preparing or consuming the food spread. This drawback of natural peanut butter is reason enough for many to avoid this food because they don't want to deal with the mess or hassle involved in preparing what was traditionally regarded as a quick and easy-to-prepare meal. There is a need for a device that reliably and effortless mixes separated nut butter back into a spread in a known amount of time.

SUMMARY OF THE INVENTION

The present invention is a powered apparatus that slowly rotates a closed container of food spread, such as a closed jar of nut butter, until the solids and liquids are evenly distributed throughout the entire jar of food spread. In a preferred embodiment, a jar of spread is positioned on at least one drive roller that slowly rotates the container. The at least one drive roller is powered, such as by a small motor connected to a low voltage DC power source. The drive roller preferably rotates against the side of the food spread jar, imparting angular velocity to the jar, while gravity and at least one guide align the container to maintain engagement with the drive roller.

Figures 1, 2:
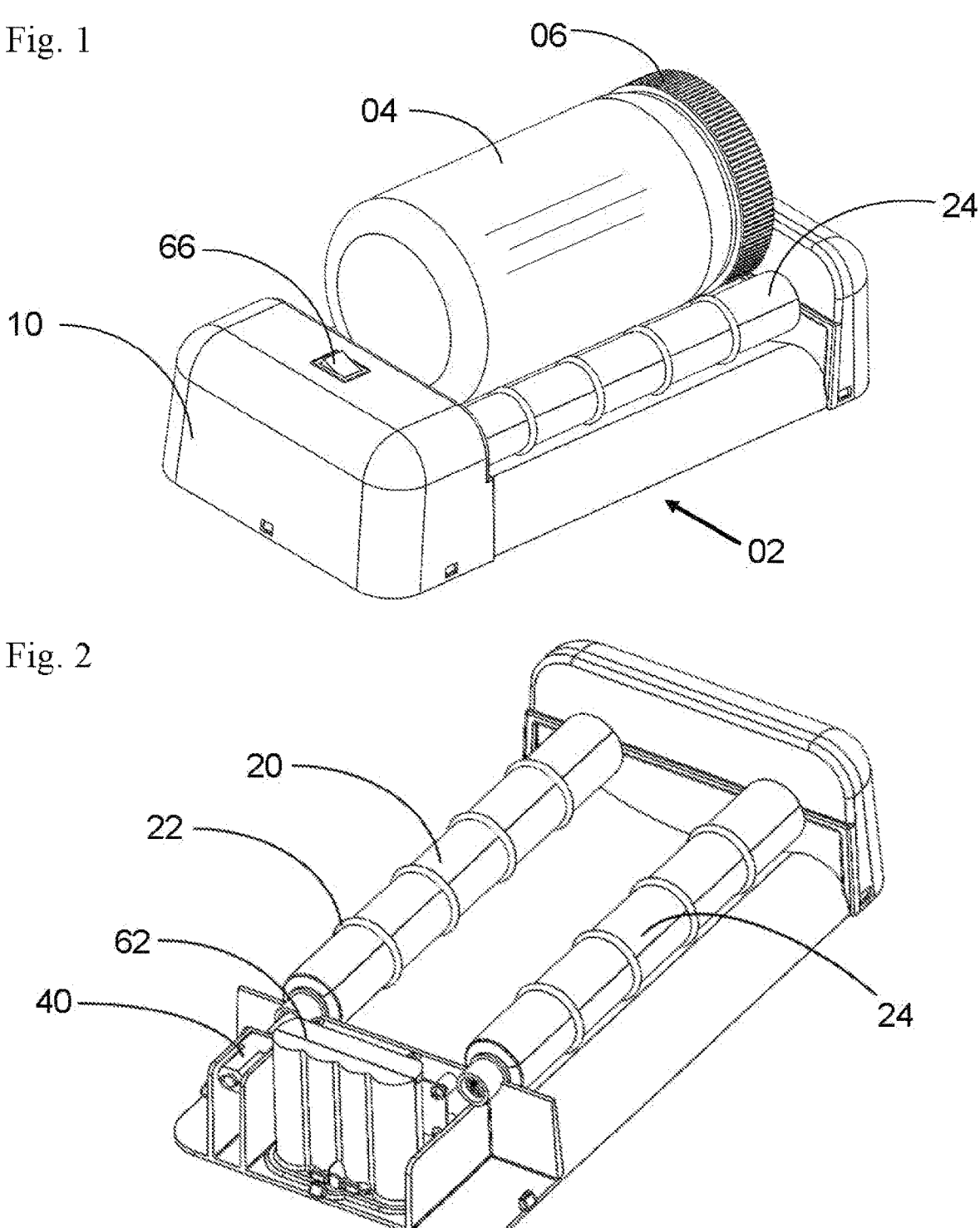
FIG. 1 is a perspective view of an automatic food spread mixer with a preferred idler roller.
FIG. 2 is a perspective view of the automatic food spread mixer of FIG. 1 with part of the case removed.

Callouts used in FIGS. 1 through 16:

02 food spread mixer
04 jar of food spread
06 lid
10 housing
20 drive roller
22 non-slip layer
24 idler roller
30 coupler
40 motor
42 belt
44 drive pulley
46 support pulley
48 circuit board
50 motor gear
52 drive gear
54 slave gear(s)
56 planetary gear
60 control board
62 battery compartment
64 USB power port
66 User control(s)

DETAILED DESCRIPTION OF THE INVENTION

Throughout this description, unless otherwise stated or shown, a food spread mixer may have multiples or pairs of similar parts, such as bearings and gears, so use of the plural for a single callout or feature is intended to describe similar parts in substantially the same way. Use of the same callout from drawing to drawing is intended to mean the same feature from a functional perspective even if features from drawing to drawing are not identical. The most preferred food spread mixer 02, shown in FIGS. 1-3, has a housing 10 that houses a motor 40 that rotates a drive roller 20 that rolls against a jar of food spread 04 such that the jar rotates at approximately 16 rpm. An alignment member, such as idler roller 24, keeps the jar positioned against the drive roller.

A food spread is any food that has been ground or otherwise processed into something that is described as a spread, paste or butter. Food spreads are commonly spread onto bread or crackers. Some food spreads maintain their consistency for their entire shelf life, while others quickly separate into liquids and solids. The present apparatus benefits food spreads that separate so quickly that they are not useable when first opened without stirring or mixing the food back into a spread. The messiest and most difficult to stir are nut butters that don't have any added stabilizer. Throughout this specification, the term "nut butter" is intended to mean any of the various natural peanut butters, almond butters, hazelnut butters, cashew butters or other food spreads that lack a stabilizer and are likely to separate during their shelf life.

A jar of food spread 04, such as the one shown in FIG. 1 which contains nut butter, is usually smaller than a jar of no-stir peanut butter that won't separate, possibly because a giant jar of separated nut butter would be extremely difficult to mix. Typical nut butter jars are either plastic or glass with sizes between about 12 and 28 ounces. Larger jar sizes have a diameter of about 3.5 inches and a height of about 6 inches. A lid 06 on a jar of nut butter screws on clockwise, and a lid almost always has a slightly smaller diameter than the jar itself. To prevent a lid from unscrewing while the jar rotates, it is preferred to have the jar rotate counter-clockwise (looking down at the lid) so that frictional forces from the peanut butter resisting rotation apply a clockwise rotation to the lid to prevent it from unscrewing. Not all food spread containers have lids that screw on, so the term jar includes a can with a flexible lid that snaps over an open end of the can.

An ideal rotation rate may vary depending on food spread brand, jar size and jar fullness. The rotation rate needs to be slow enough to not be turbulent. For a larger jar that is full, the ideal rate of rotation was observed to be approximately 16 revolutions per minute (rpm) for about an hour. Throughout this description, the term approximately means that the actual can deviate from the stated by as much as 50%. A rate of rotation of between 10 and 22 rpm was consistently observed to be effective. Increasing or decreasing the rate of rotation outside of those ranges increased the overall time required to mix an entire jar of separated nut butter back into a spread. By example, it was observed that a 2⅞ inch diameter jar of separated nut butter took about 3 hours to mix at 100 rpm, and the same size jar of nut butter took longer than a full day at about 1000 rpm. The rotation rate can be variable, such as by selecting a different rate or rotation for a larger or smaller diameter jar.

Figure 3:
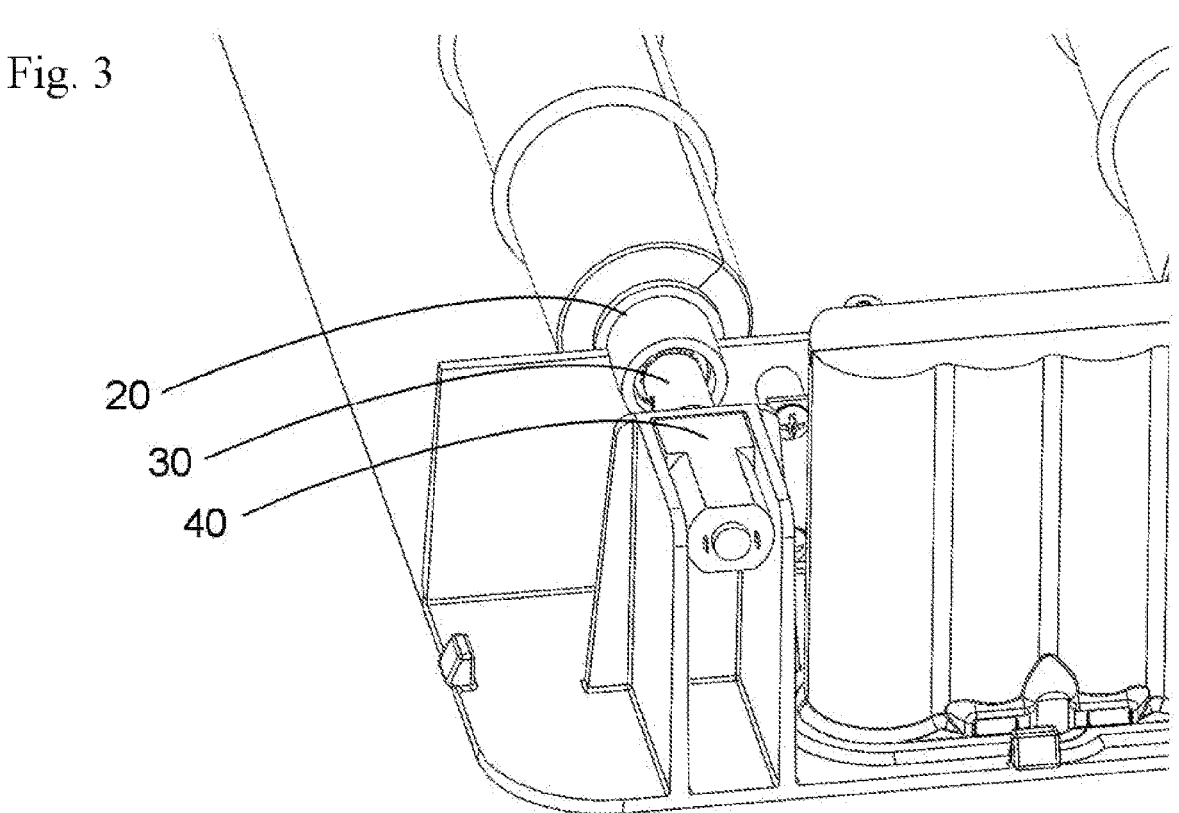
FIG. 3 is a perspective view of a drive portion of the automatic food spread mixer of FIG. 2.

As shown in FIGS. 2 and 3, a drive roller 20 is the preferred mechanism for imparting motion to a jar of nut butter. Fixing the rate of rotation of the drive roller will cause jars having different diameters to rotate at different rates. The preference is to have a default speed of the drive roller set to cause a 3.5 inch diameter jar to rotate at 16 rpm. Smaller diameter jars will rotate at a slightly faster rate if the drive roller speed is fixed. If larger jars become available in the market, then they would rotate at a speed slower than 16 rpm, which is acceptable.

Figure 4:
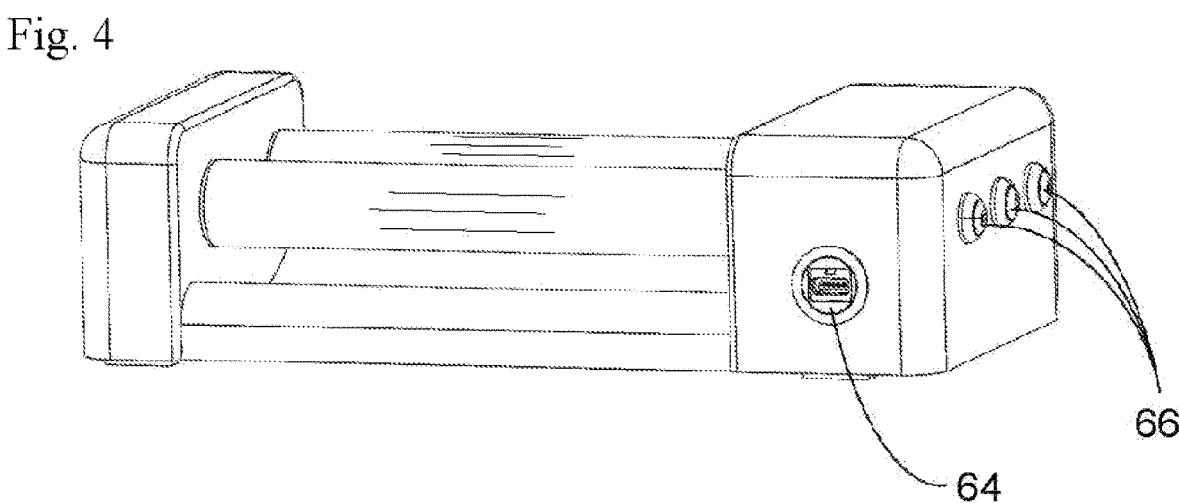
FIG. 4 is a perspective view of an automatic food spread mixer with anti-slip rollers and a USB receptacle.

A power source is preferably batteries, such as four 1.5 volt AA size batteries installed into battery compartment 62 shown in FIG. 2, that will operate the food spread mixer for several months of normal intermittent use. An alternate power supply is 5 volts DC from a common USB power supply that plugs into USB power port 64, as shown in FIG. 4. Yet another alternate power supply is a wind-up clockwork mechanism that uses a spring and a series of gears to drive the drive roller, such as the drive mechanism shown and described in U.S. Pat. No. 301,846 issued to W. A. Wright on Jul. 8, 1884 for a "Toy Boat."

A run time of one hour has shown to be adequate for a large jar of separated food spread rotating at 16 rpm, and the simplest way to start an automatic food spread mixer is by operating user control 66, as shown in FIG. 1, which may just be an on/off switch. A timer may be used to automatically stop the mixer after a predetermined amount of time has passed. For food spreads that are only mildly separated, a refresh button could be added to allow for a shorter run time, such as 30 minutes. FIG. 4 shows several user controls 66 that may have different functions as just described. Yet another option would be to have the automatic food spread mixer run at intervals, such as every 24 hours it will run for 30 minutes, so that a jar of nut butter is not allowed to noticeably separate. These times could be pre-programmed, or they could be programmed by a user based on their schedule and preferred nut butter spread. The mixer could have a clock so that specific times could be programmed by a user, such as 70 minutes every Monday at 6 am. Many nut butters won't separate quickly if refrigerated, so refrigeration after mixing is an option for users who don't mind spreading cold nut butter.

A housing 10 is provided to support and align a motor, gears, shafts and other components that cause the drive roller to rotate. The housing is preferably molded plastic, such as PVC, polyethylene, polypropylene, acrylic or other similar material. The housing could alternatively be metal, or a combination of plastic with metal reinforcements. Rubber feet on the bottom of the housing, if desired, should be non-marking and prevent the mixer from walking.

A DC motor 40 is the preferred means for driving the drive roller 20, as shown in FIGS. 2 and 3. Small DC motors are cheap and provide adequate torque when combined with gears that rotate the drive roller at a desired relatively slow speed. By example, but not limitation, a mini DC motor rated at about 6 volts DC with a rated load of approximately 500 g-cm, a load speed of approximately 50 rpm and rated load current of approximately 150 mA is adequate. Such a mini DC motor weighs as little as 10 grams and can be powered by common single cell dry batteries or a 5v DC power source. The motor is secured to the housing, and a shaft of the motor rotates gears, pulleys and/or belts selected to cause a desired rate of rotation to the drive roller. A coupler 30 may be required to connect a shaft of a motor to a drive roller, as shown in FIG. 3.

As shown in FIG. 2, the drive roller 20 is preferably a cylinder that is at least six inches long and has about a one inch diameter. To achieve approximately 16 rpm for a 3.5 inch diameter jar of food spread, a one inch diameter drive roller should ideally rotate at approximately 55 rpm when under load. One or more bearings secured to the housing may be necessary for quiet and reliable operation of the food spread mixer. A bearing on the end of the drive roller that is farthest from the motor may be used to carry some of the weight of a jar of food spread. The drive roller is preferably a hollow tube of molded or extruded plastic, which could just be PVC or ABS pipe. To prevent slipping between the drive roller and a jar of food spread a non-slip layer 22, such as bands, a sleeve or a coating, should be applied to the outer surface of the drive roller. The drive roller may be dipped or sprayed to apply a silicon or similar non-slip layer, as shown in FIG. 4.

Figure 5:
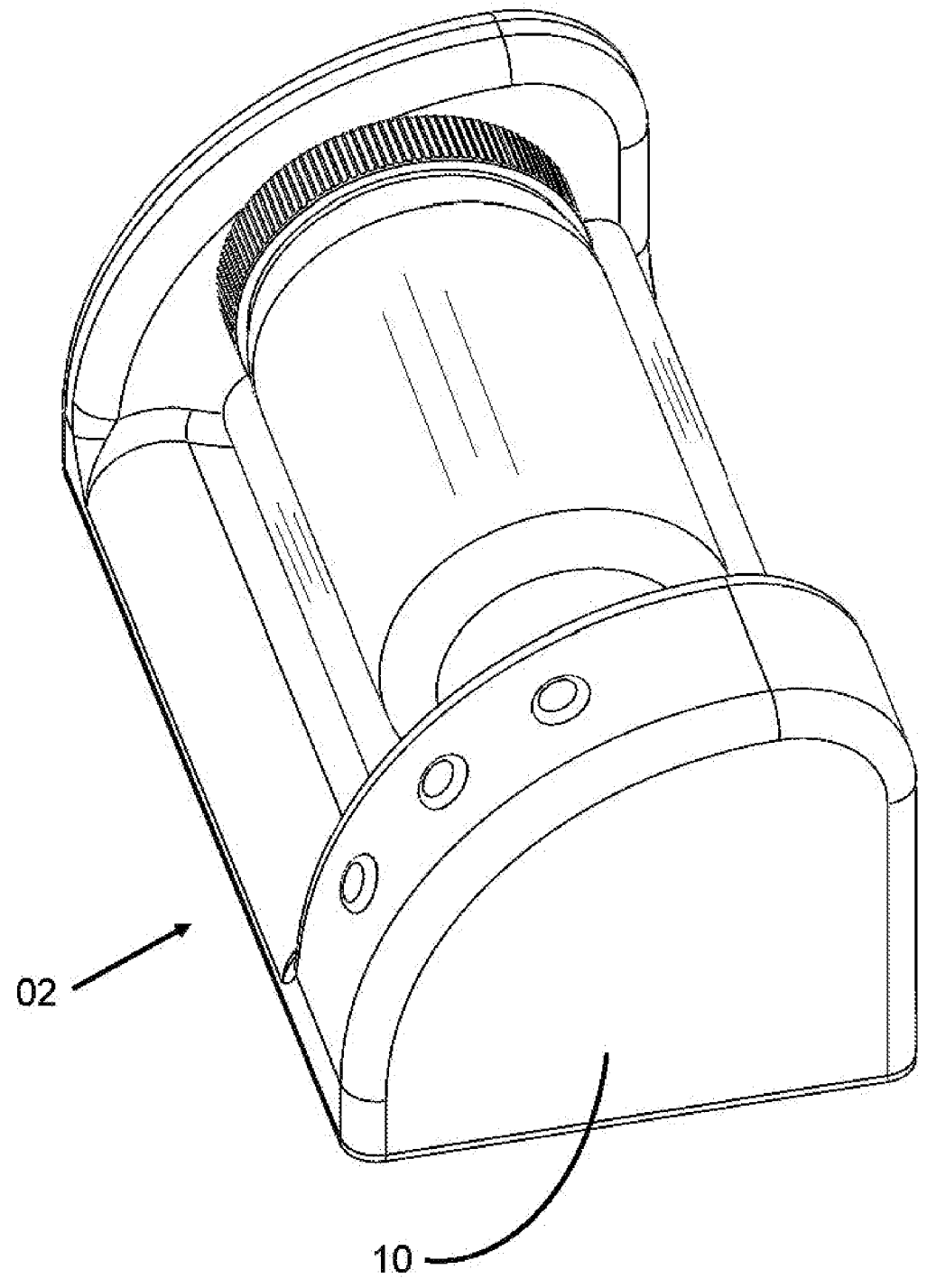
FIG. 5 is a perspective view of an automatic food spread mixer with a raised idler roller.
Figure 6:
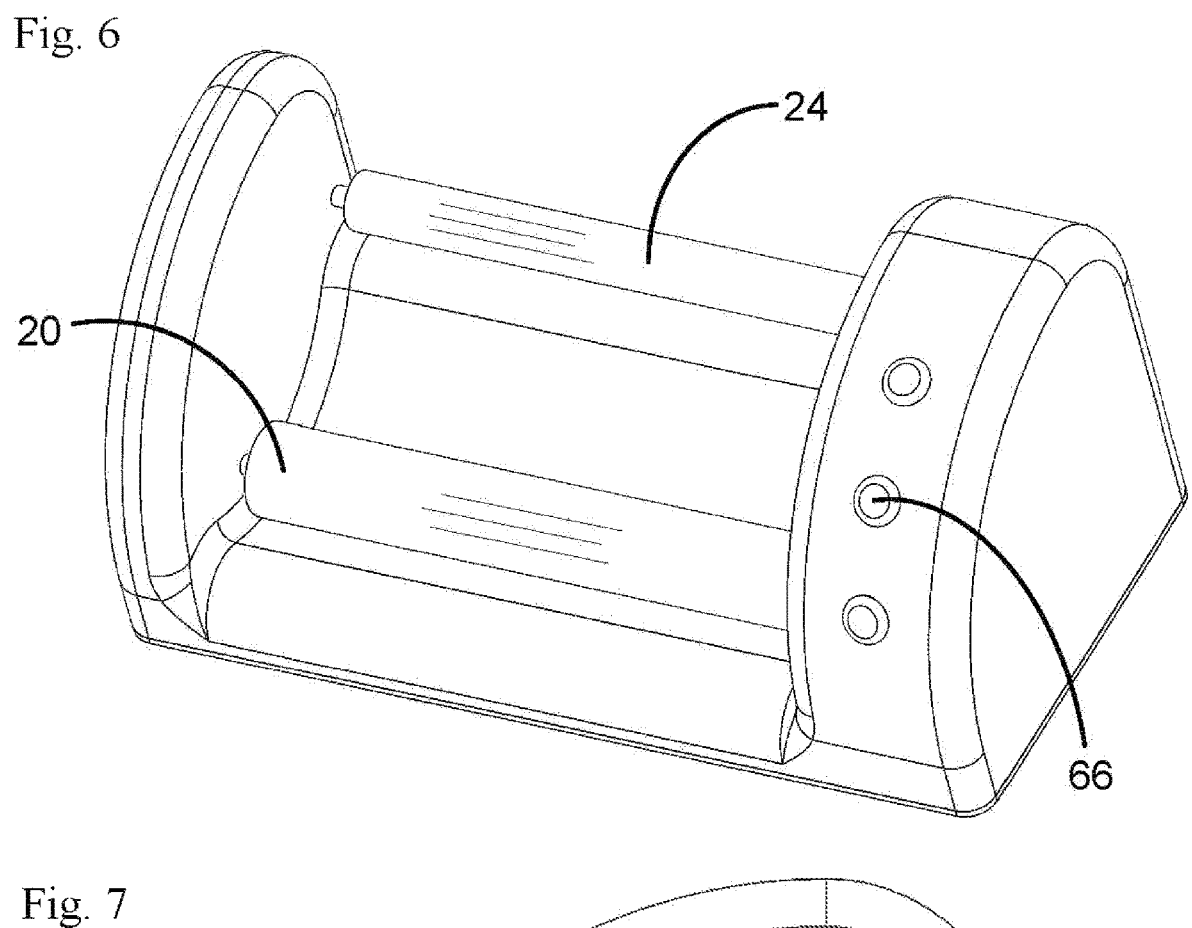
FIG. 6 is another perspective view of the automatic food spread mixer of FIG. 5.
Figure 7:
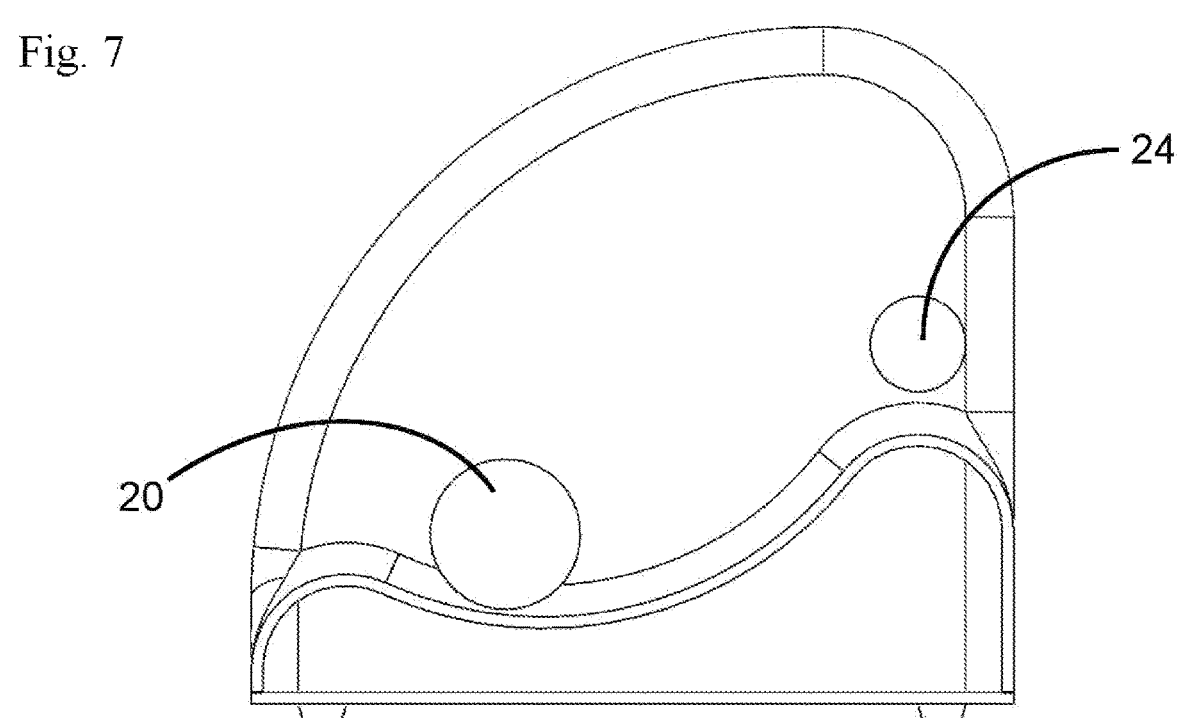
FIG. 7 is side cross sectional view of the automatic food spread mixer of FIG. 6.

An alignment member, such as idler roller 24, is used to align a jar of food spread such that the jar of food spread rolls against the drive roller 20. The alignment member is preferably another roller positioned parallel to the drive roller and the rollers may be at the same elevation, as shown in FIGS. 1-4. FIGS. 5-7 show an idler roller having a smaller diameter than the drive roller, and the idler roller is at a higher elevation such that the weight of a jar of food spread remains mainly on the drive roller. The housing 10 may be a more aesthetic design that better encompasses a jar of food spread. The alignment member could be one or more structures fixed to the housing to prevent a jar of food spread from falling off of the drive roller, in which case it would be desirable to have the drive roller supporting most of the weight of a jar of food spread.

Figure 8:
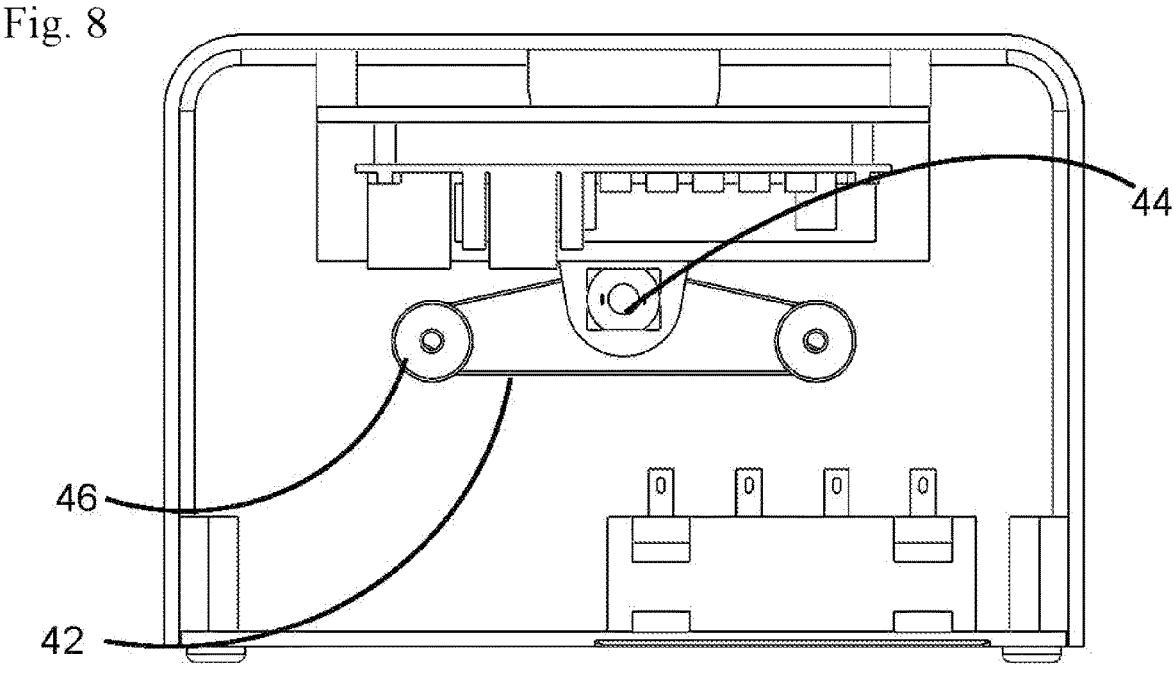
FIG. 8 is a cross sectional view of a belt driven automatic food spread mixer.

The alignment member could be a second drive roller that is the same diameter as the drive roller. As shown in FIG. 8, two drive rollers may be driven by a belt 42 that is driven by drive pulley 44. The belt also rotates support pulley 46.

Figure 9:
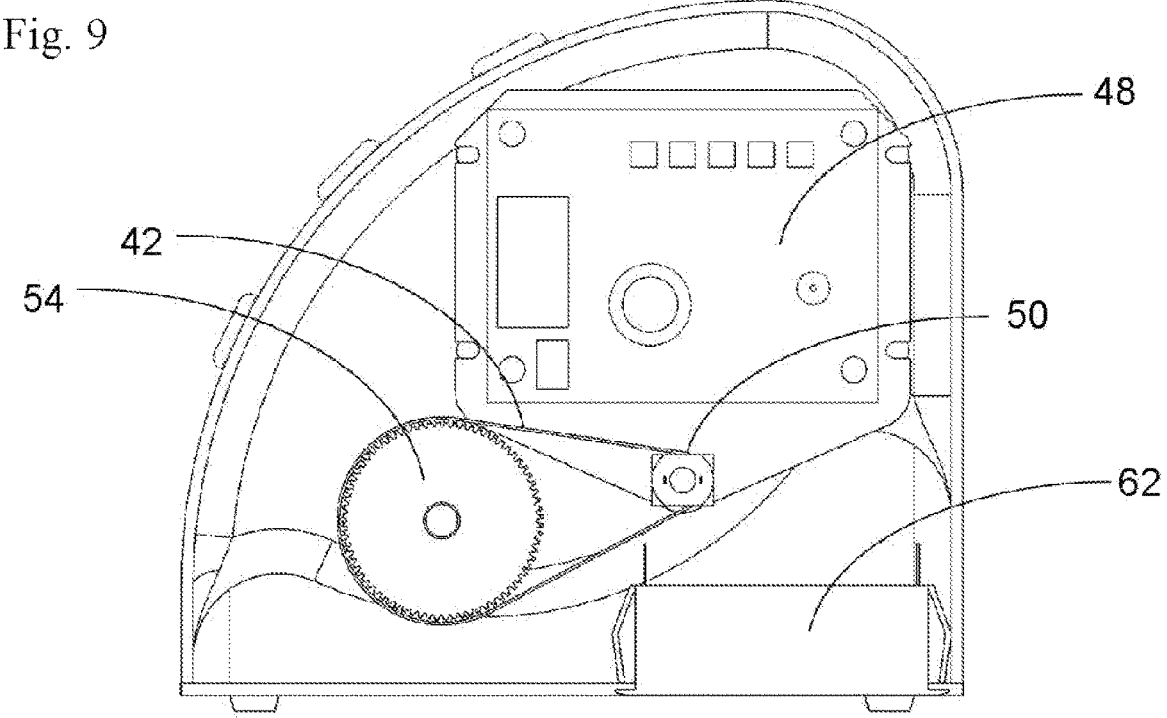
FIG. 9 is a cross sectional view of a belt driven RPM reducer automatic food spread mixer.
Figure 10:
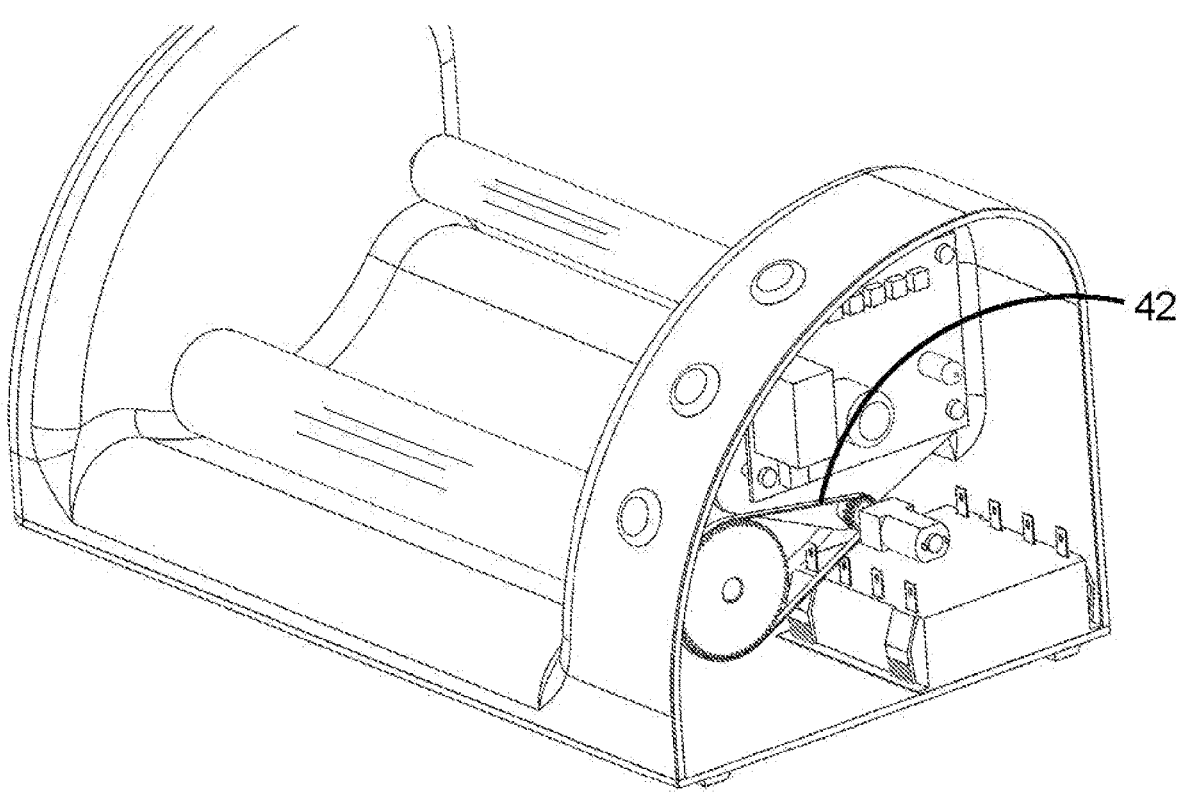
FIG. 10 is a perspective view of the automatic food spread mixer of FIG. 9 with a portion of the housing removed.

As shown in FIGS. 9 and 10, a belt 42 may be used to reduce the rotational rate of the drive roller by having a smaller diameter motor gear 50 turn the belt that rotates a larger diameter slave gear 54. Such a motor rpm reducer allows a higher rpm mini DC motor to be selected for reducing cost. A smaller diameter idler roller may be used to additionally reduce cost. As with other embodiments that show a control board, control board 60 controls the circuitry of the food spread mixer.

Figure 11:
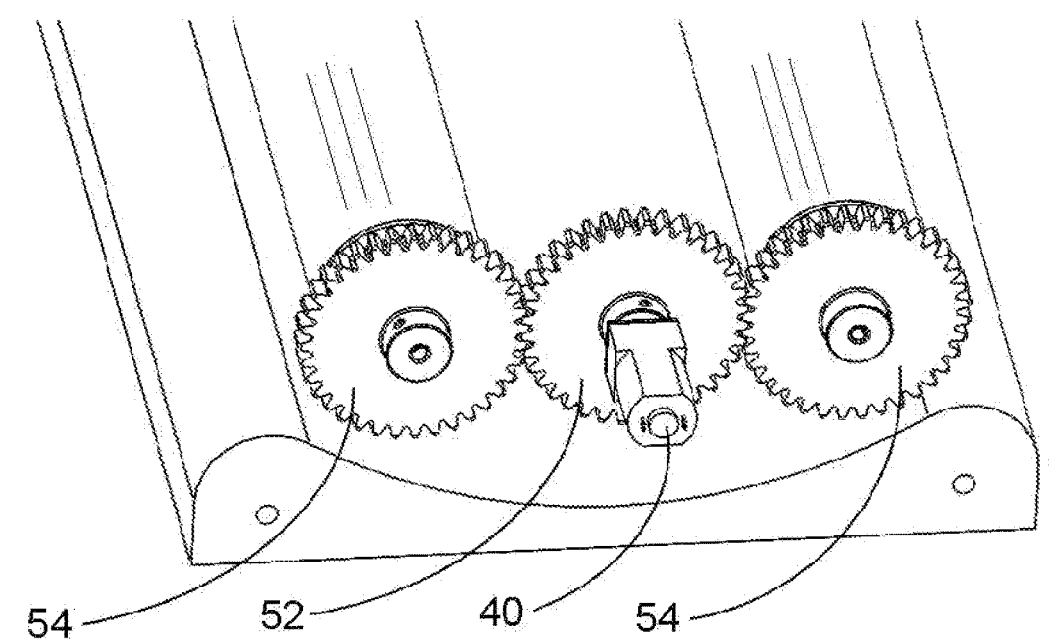
FIG. 11 is a perspective view of gears for a an automatic food spread mixer
Figures 12, 13:
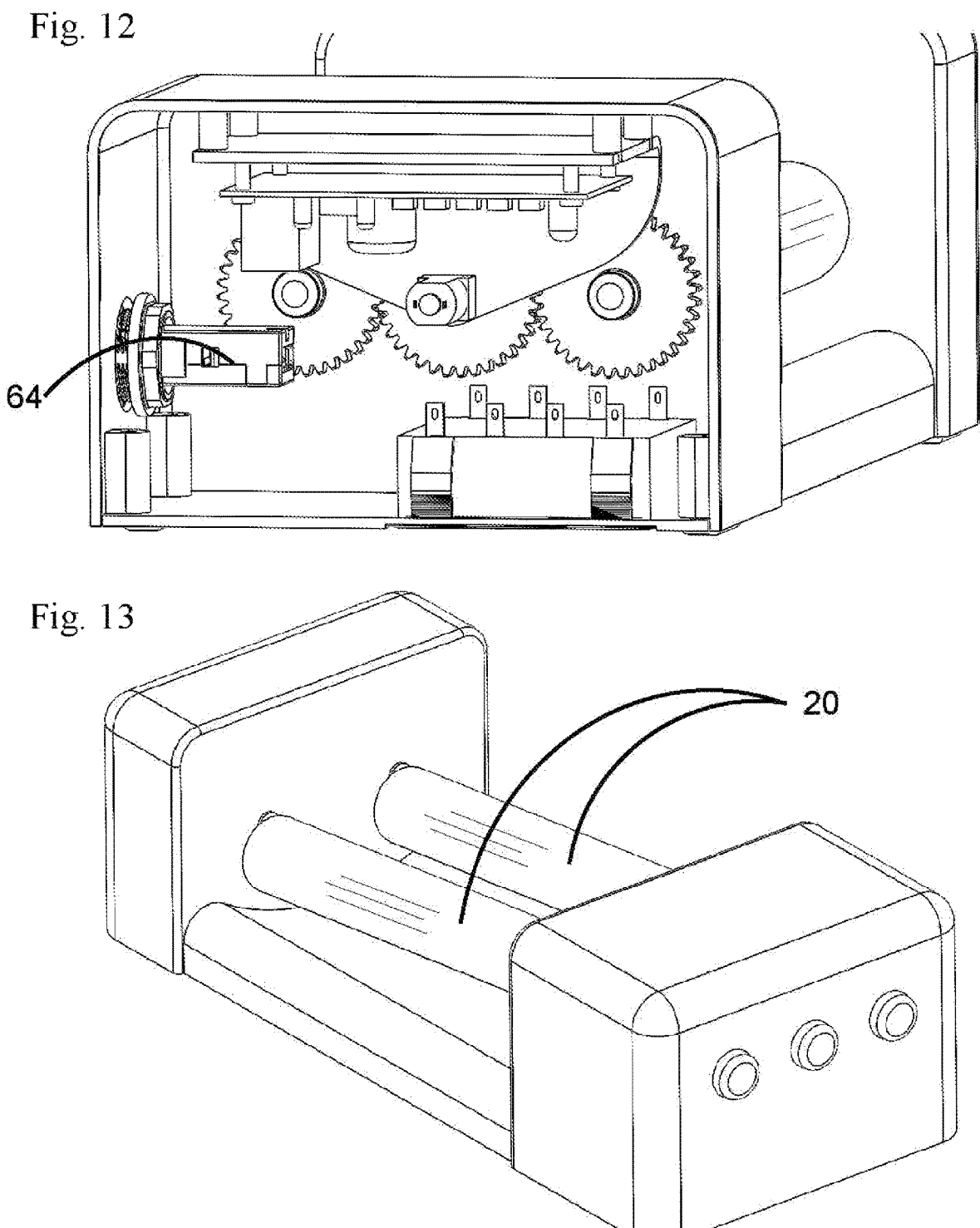
FIG. 12 is a perspective view of an automatic food spread mixer that uses the gears shown in FIG. 11.
FIG. 13 is a perspective view of an automatic food spread mixer with offset rollers.
Figure 14:
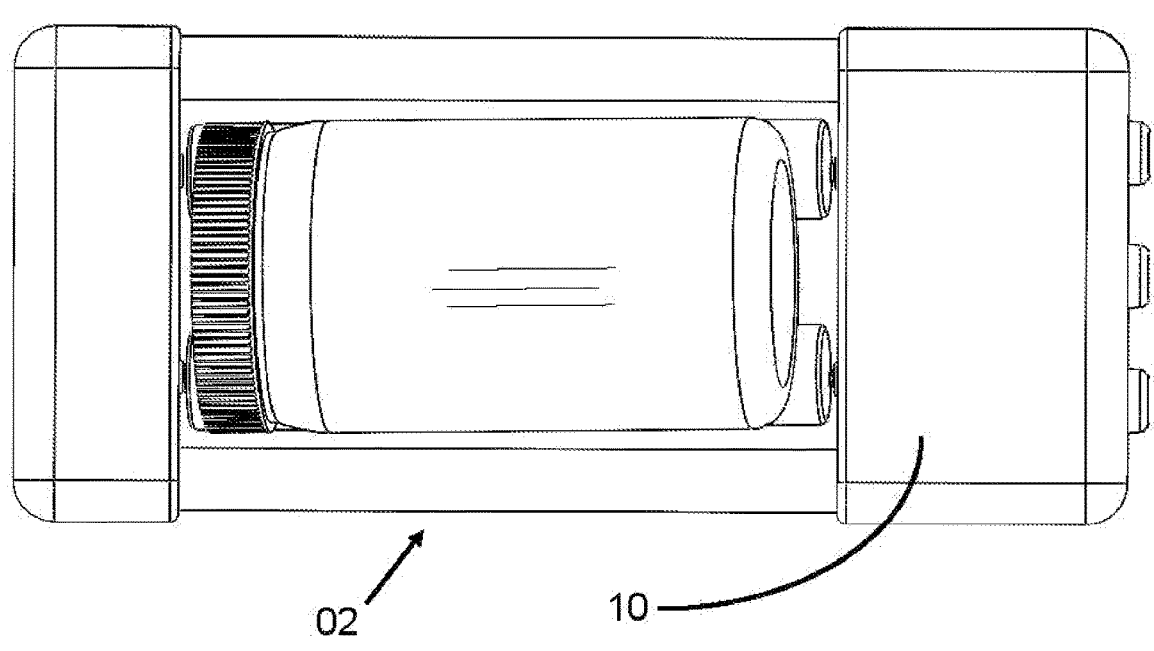
FIG. 14 is a top view of the automatic food spread mixer of FIG. 13.
Figure 15A:
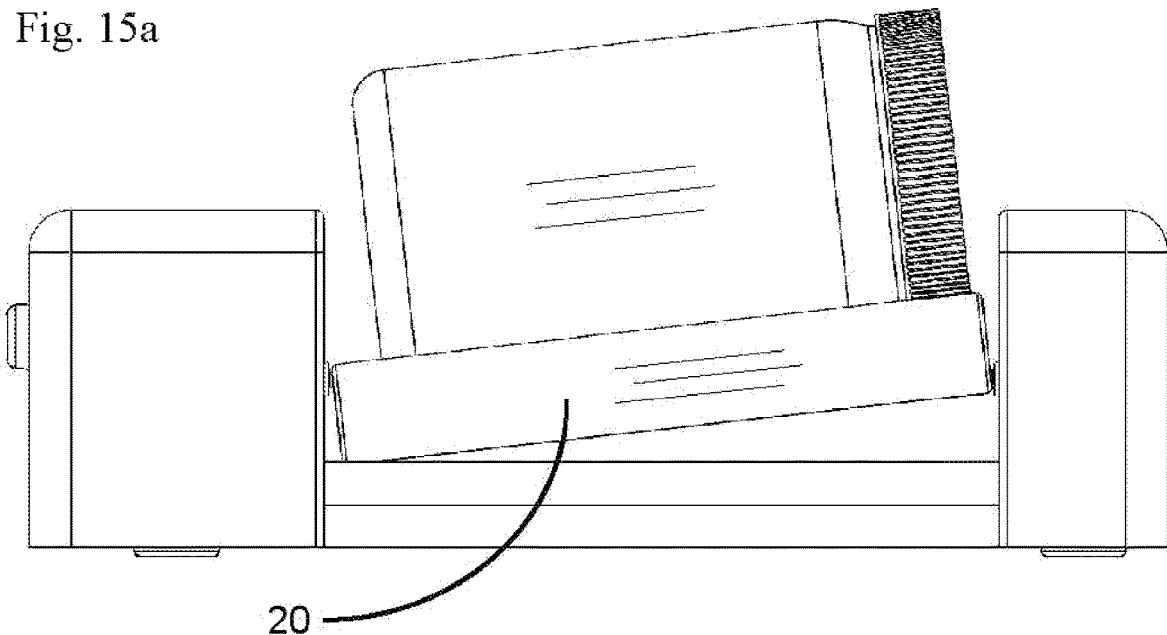
FIGS. 15a and 15b are side views of the automatic food spread mixer of FIG. 14 but with the offset rollers in different operating positions.
Figure 15B:
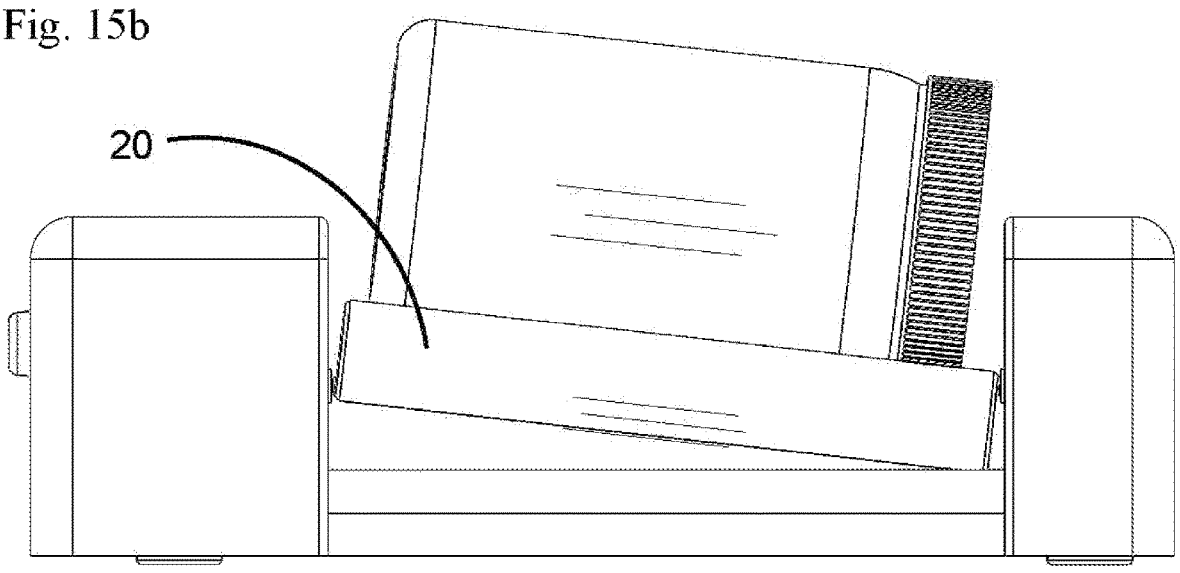

A direct drive option is shown in FIGS. 11 and 12, which is an acceptable option provided a suitable motor 40 is sourced. Most mini motors available in the market have relatively high rpm ratings that may discourage such a design, but using a drive gear 52 to drive two slave gears 54 that rotate two drive rollers will reduce slip while maintaining good alignment of the jar of food spread.

Yet another alternative design that uses two rollers to support the jar of food spread is shown in FIGS. 13-15b. This offset roller design has one or both of the rollers as drive rollers 20, with the less dominant roller functioning as an alignment member. The axis of rotation of each of these rollers is offset relative to their geometric axis such that the rotating rollers additionally cause a jar to experience a top to bottom wave motion in addition to the rotational motion, as can be seen by comparing FIGS. 15a and 15b.

Figure 16:
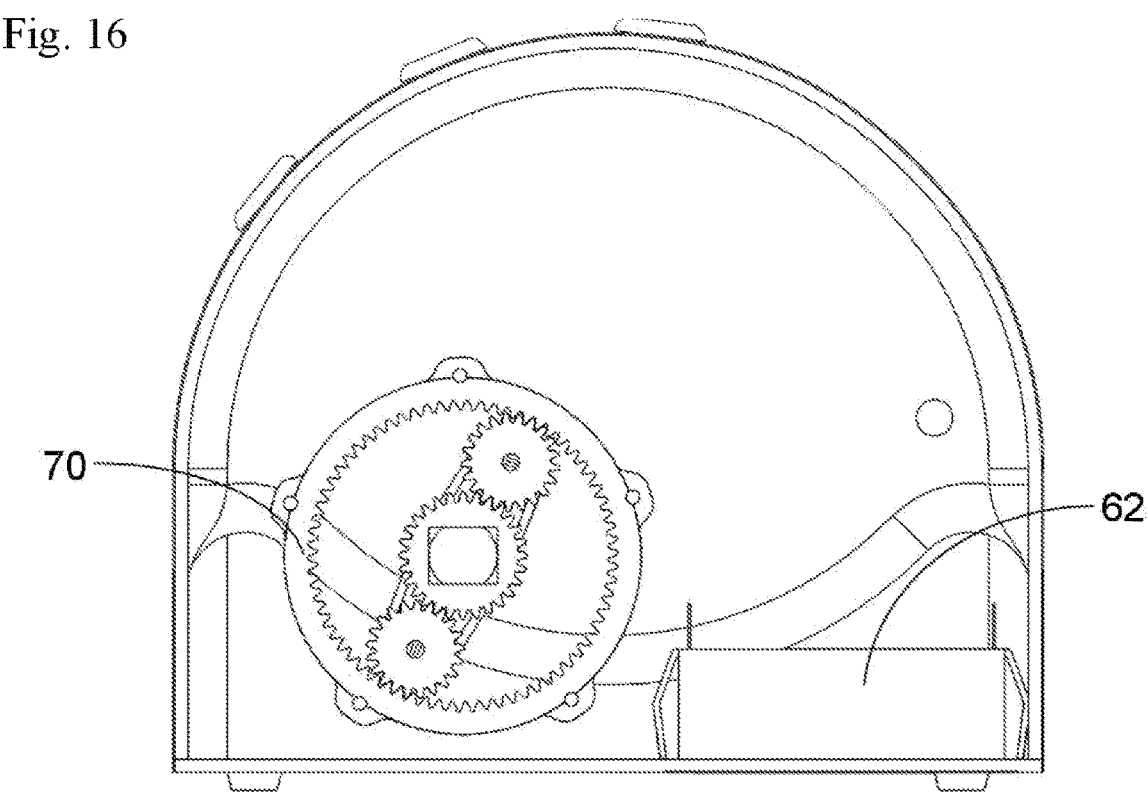
FIG. 16 is a perspective view of an automatic food spread mixer that uses a planetary gear.

Yet another drive option is shown in FIG. 16, which uses a planetary gear 56 as an rpm reducer. Here, an idler roller is shown as the alignment member even though some of the other alignment members already described would be suitable substitutes.

When a jar of food spread is partially consumed, the emptiness of the jar can contribute to unwanted surface tension that can become a problem that reduces the effectiveness of the food spread mixer. To counter this problem, collapsible legs, similar to a kick stand, may be added to a housing to raise a jar of food spread so that it is, by example and not limitation, 30 degrees from horizontal. This will keep the mass of food closer together and encourage better mixing of a partially consumed jar of food spread.

To maintain the preferred rpm for different jar sizes, a potentiometer may be used below a support of the housing. The location of the potentiometer is preferably below the housing at a point where the weight of a jar is easily determined, such as below the motor, with two fixed supports generally under a far end of the housing opposite where the motor is located. The two fixed supports and the support used to measure the weight should be designed as a stable tripod support for the entire housing. The potentiometer would turn the unit off when there is no jar or external weight positioned on the automatic food spread mixer. When a large and full jar of food spread is placed on the mixer, the potentiometer would be at 100 percent and the mixer would rotate the jar at a maximum rate that should rotate a 3.5 inch diameter jar at approximately 16 rpm. When a full small jar, or a partially full large jar, is placed on the mixer, potentiometer would drop the voltage such that the smaller jar would rotate at approximately 16 rpm, and the partially consumed jar should rotate at a slower than 16 rpm rate. The potentiometer could simply adjust the voltage to the motor to decrease the rpm of the drive roller, which is why a partially consumed jar will rotate at a slower than ideal rate.

In an alternative embodiment of the present apparatus, the drive roller is one or more wheels driven by a motor. In yet another alternative embodiment of the present apparatus, the drive roller rotates a wide belt into which a jar of food spread is slung.

While a preferred form of the invention has been shown and described, it will be realized that alterations and modifications may be made thereto without departing from the scope of the following claims.

What is claimed is:

1. An automatic food spread mixer comprising:
a housing;
a drive roller that is at least partially supported by the housing in a substantially horizontal position;
an alignment member that is at least partially supported by the housing;
an electric motor used to apply a torque that rotates the drive roller;
a potentiometer below a first support of the housing that adjusts a voltage to the electric motor such that a rotational rate of the drive roller is determined by how much weight is placed on the food spread mixer; and
wherein a jar of food spread that has separated, when positioned against the drive roller, rotates until the food spread is substantially mixed.

2. The automatic food spread mixer of claim 1 wherein the drive roller is at least partially covered by a non-slip layer.

3. The automatic food spread mixer of claim 1 further comprising a second support and a third support under an end of the housing opposite the first support such that the automatic food spread mixer is supported by three supports.

4. The automatic food spread mixer of claim 3 wherein the electric motor has a load current of approximately 150 mA.

5. The automatic food spread mixer of claim 4 further comprising an rpm reducer.

6. The automatic food spread mixer of claim 1 wherein the voltage is adjusted to one hundred percent when the weight placed on the food spread mixer is twenty eight ounces or more.

7. The automatic food spread mixer of claim 1 further comprising gears that drive the drive roller.

8. The automatic food spread mixer of claim 1 further comprising an on/off switch that is mechanically switched by applying or removing weight to the drive roller.

9. The automatic food spread mixer of claim 1 further comprising a timer for automatically operating the drive roller for approximately 70 minutes.

10. The automatic food spread mixer of claim 1 wherein the food spread is nut butter.

11. The automatic food spread mixer of claim 1 wherein the drive roller is offset relative to its geometric axis such that the rotating drive roller additionally causes the jar of food spread to experience a top to bottom wave motion in addition to rotational motion.

12. The automatic food spread mixer of claim 3 further comprising a battery compartment.

13. An automatic food spread mixer comprising:
a housing;
a drive roller that is at least partially supported by the housing in a substantially horizontal position;
an alignment member that is at least partially supported by the housing;
an wound spring used to apply a torque that rotates the drive roller;
wherein a jar of food spread that has separated, when positioned against the drive roller, rotates until the food spread is substantially mixed.

14. An automatic nut butter mixer comprising:
a drive roller that rotates a wide belt within which a jar of nut butter is slung;
a mini DC electric motor that rotates the drive roller; and a housing that houses the mini DC electric motor and supports the drive roller.

* * * * *